(12) United States Patent
McCall et al.

(10) Patent No.: US 9,219,623 B2
(45) Date of Patent: Dec. 22, 2015

(54) ADAPTIVE DELAY BASE LOSS EQUALIZATION

(75) Inventors: James A. McCall, Beaverton, OR (US); Klaus Ruff, Beaverton, OR (US); David Shykind, Sherwood, OR (US); Santanu Chaudhuri, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 2974 days.

(21) Appl. No.: 10/956,426

(22) Filed: Sep. 30, 2004

(65) Prior Publication Data

US 2006/0067398 A1    Mar. 30, 2006

(51) Int. Cl.
*H04L 25/02* (2006.01)
*H04L 7/00* (2006.01)
*H04L 25/03* (2006.01)

(52) U.S. Cl.
CPC .......... *H04L 25/0224* (2013.01); *H04L 7/0008* (2013.01); *H04L 25/03878* (2013.01); *H04L 2025/03751* (2013.01)

(58) Field of Classification Search
USPC ......................................... 375/229, 232, 236
See application file for complete search history.

(56) References Cited

U.S. PATENT DOCUMENTS

| | | | | |
|---|---|---|---|---|
| 5,805,983 | A * | 9/1998 | Naidu et al. | 455/67.16 |
| 6,009,488 | A | 12/1999 | Kavipurapu | |
| 6,265,951 | B1 * | 7/2001 | Kirshtein | 333/28 R |
| 6,466,626 | B1 | 10/2002 | Cecchi et al. | |
| 6,864,689 | B2 * | 3/2005 | Stephen et al. | 324/616 |
| 2003/0016091 | A1 | 1/2003 | Casper | |
| 2003/0058803 | A1 | 3/2003 | Casper | |
| 2003/0132872 | A1 | 7/2003 | Casper et al. | |
| 2003/0161394 | A1 | 8/2003 | Shi et al. | |
| 2003/0202617 | A1 | 10/2003 | Casper | |
| 2003/0217301 | A1 | 11/2003 | Levy et al. | |
| 2004/0044861 | A1 | 3/2004 | Cavallo et al. | |
| 2004/0093423 | A1 * | 5/2004 | Kaniyur et al. | 709/232 |
| 2004/0119461 | A1 | 6/2004 | Casper et al. | |
| 2004/0119530 | A1 * | 6/2004 | Jaussi et al. | 327/552 |
| 2004/0120092 | A1 | 6/2004 | Jaussi et al. | |
| 2004/0124940 | A1 * | 7/2004 | Ryu et al. | 333/12 |
| 2004/0130469 | A1 | 7/2004 | Casper | |
| 2004/0184487 | A1 | 9/2004 | Kim | |
| 2004/0223566 | A1 * | 11/2004 | Yamashita | 375/354 |

FOREIGN PATENT DOCUMENTS

| | | |
|---|---|---|
| CN | 1467953 | 1/2004 |
| WO | WO-2004059478 | 1/2004 |

OTHER PUBLICATIONS

Intel Corporation, First Office Action mailed Sep. 4, 2009 for Chinese Application No. 200580032352.4, 27 pages.
Intel Corporation, Second Office Action mailed May 11, 2010 for Chinese Application No. 2005800323522.4, 28 pages.
Intel Corporation, Third Office Action mailed Jan. 25, 2011 for Chinese Application No. 2005800323522.4, 30 pages.
Intel Corporation, Decision of Rejection mailed Jun. 24, 2011 for Chinese Application No. 2005800323522.4, 33 pages.
Intel Corporation, Office Action mailed Mar. 27, 2007 for German Application No. 11 2005 002 379.6-31, 8 pages.

* cited by examiner

*Primary Examiner* — Jaison Joseph
(74) *Attorney, Agent, or Firm* — Blakely, Sokoloff, Taylor & Zafman LLP

(57) ABSTRACT

A method, system and apparatus to self-determine equalization parameters for a channel. An initiator sends an equalization insensitive signal (EIS) to a responder on channel to be equalized and begins a count. A responder responds with an EIS. When the initiator receives the response EIS the count is terminated. The count, which constitutes a measure of delay in the channel, may be used to determine desirable equalization parameters for the channel.

5 Claims, 3 Drawing Sheets

ADAPTIVE DELAY BASE LOSS EQUALIZATION

BACKGROUND

1. Field

Embodiments of the invention relate to chip to chip signaling. More specifically, embodiments of the invention relate to channel equalization to facilitate chip to chip signaling.

2. Background

Channel equalization in chip to chip signaling has become increasingly important as manufacturers attempt to extend performance while using existing low cost interconnects. As data rates continue to climb, the number of equalization (EQ) coefficients increase. This increases the potential number of combinations for-optimal EQ coefficient settings per platform with a single chip design. One solution is to simply fix the settings per platform so there is sufficient margin for a worst case scenario. However, this solution typically results in sub-optimal performance.

Another solution is to use firmware programmed by an original equipment manufacturer (OEM) to set the coefficients based on the settings programmed by the OEM. This technique requires communication and documentation that must cover the range of multiple settings as a function of platform design. Since the chips cannot communicate without equalization, they must be brought up at slow speeds to communicate the EQ settings to responding chips on a channel. A more flexible approach to setting channel equalization parameters is desirable.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
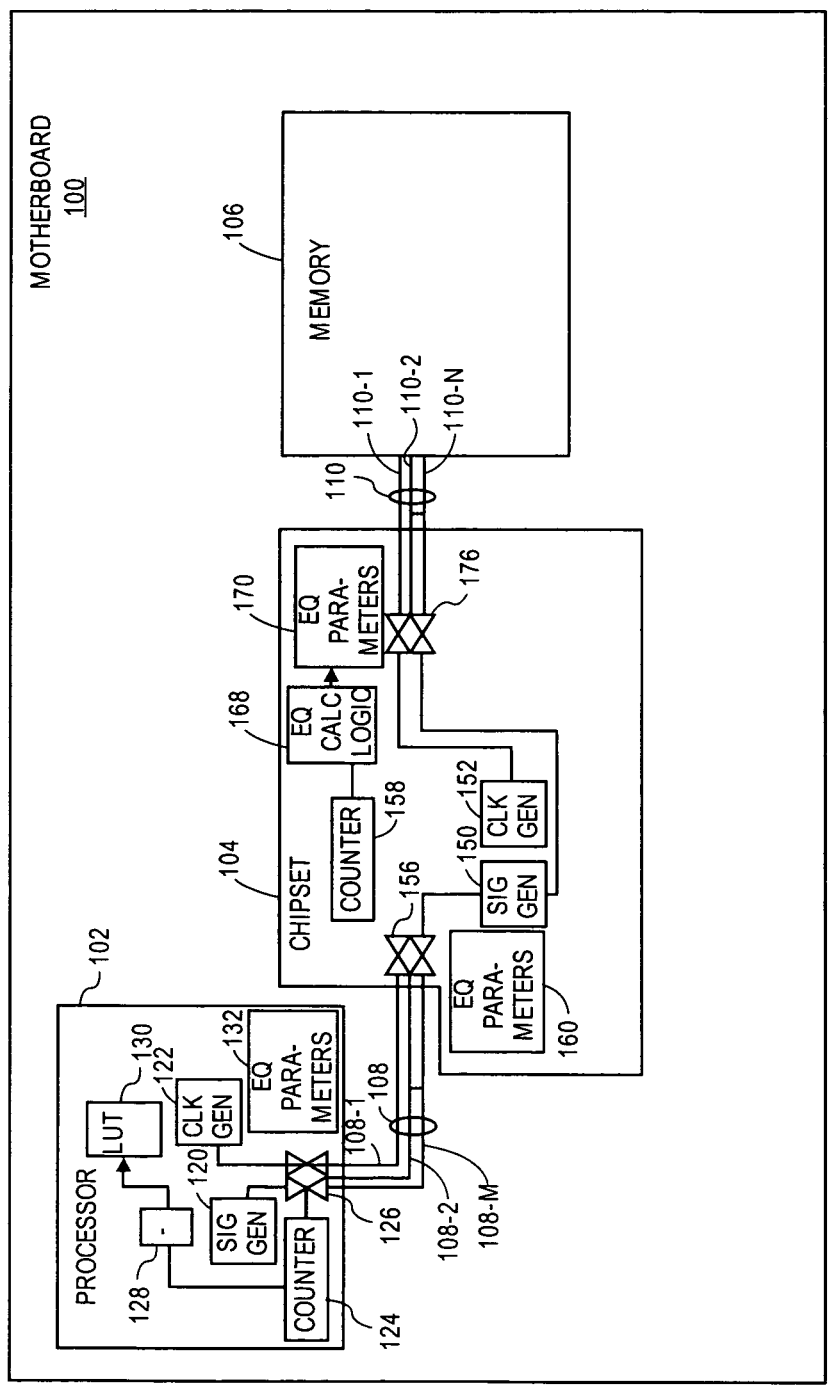
FIG. 1 is a block diagram of a system of one embodiment of the invention.

FIG. 1 is a block diagram of a system of one embodiment of the invention. A motherboard 100 has a processor 102 coupled thereto. A chipset 104 is also coupled to motherboard 100. Motherboard 100 defines a channel 108 between the processor and the chipset. Channel 108 may include a forward link and a return link with each link including a number of link elements (108-1 through 108-M, where M is an integer). As used herein, "link elements" are the individual constituents that carry signals within the channel. For example, a board trace may be a link element. Routing requirements often result in different length link elements within a channel. For example, as shown, link element 108-1 is a shortest link element in channel 108, while link element 108-M is the longest. It should be recognized that a particular channel may include arbitrarily large number of link elements depending on the size of the data path.

A memory 106 is also coupled to motherboard 100. Motherboard 100 defines a channel 110 between chipset 104 and memory 106. Channel 110 may include link elements 110-1 through 110-N where N may be an arbitrarily large integer depending on the desired width of the data path between chipset 104 and memory 106. In one embodiment, memory 106 may be a fully buffered dual inline memory module (FBD). Typical FBDs have a buffer chip, which communicates with a plurality of inline dynamic random access memories (DRAMs). Typically, the buffered chip has a point to point channel between itself and each of the DRAMs within the FBD. FBDs are often on a separate printed circuit board, which inserts into a connector on the motherboard.

Evaluation of lossy channels has revealed that the dominant limiter of signaling performance is the loss in the channel. This loss is intimately tied to equalization (EQ) parameters, e.g., the EQ tap coefficients set for the channel. Since the printed circuit board (PCB) forms the bulk of the channel, a relationship between length of the channel on the PCB and the loss. Moreover, it has been found that loss differences between PCB using the same materials are small. Moreover, the effective propagation constant is relatively small even between various material types. Similarly, connectors and packages have manual delay variation for a particular design. These facts allow the system delay on a channel to be estimated to within one unit interval (UI) based on the interconnect package, connector type and routing of the channel. As used herein, one UI is equal to one clock.

Measurement of the delay in the channel permits determination of approximate channel length, which is a dominant contribution to loss in the channel. By determining the channel length, the EQ parameters may be set to compensate for the loss in the channel.

Processor 102 includes a transceiver 126 to permit it to transmit and receive over channel 108. Processor 102 retains equalization parameters 132 for the channel 108. To determine what these parameters should be, processor 102 may initiate a signaling sequence with the chipset 104. Based on a signaling sequence explained further below, the processor is able to determine and set the equalization parameters 132. In this example, the processor 102 is the initiator. As used herein, "initiator" is a chip originating a self-determination of the equalization parameters and a "responder" is a chip recipient of the signaling from the initiator.

Processor 102 includes a signal generator 120 and a clock generator 122. The signal generator 120 generates an equalization insensitive signal (EIS) such as a step signal. The EIS is sent concurrently with a forwarded clock generated by the clock generator 122 from transceiver 126 toward the chipset 104. At the same time a count is initiated in counter 124.

Chipset 104 also has a transceiver 156 to permit it to communicate over channel 108. When chipset receives the EIS, it employs a signal generator 150 to generate an EIS in response. When the responsive EIS is received at transceiver 126 of processor 102, the count of counter 124 is terminated. The round trip delay may then be calculated by subtracting the known processing time at the responder (in this case chipset 104) from the total count from counter 124. This subtraction may be performed by an arithmetic unit 128. The resulting count may be used to index into a lookup table (LUT) 130 to identify values for one or more parameters, such as, the EQ tap coefficients which should be set based on the delay in the channel. The processor may then set those values for EQ parameters 132.

After setting the EQ parameters 132 in the processor, the processor sends the appropriate EQ parameters to the chipset, which may set its EQ parameters 160 based on the EQ parameters sent by the processor.

As discussed previously, the chipset is connected to the memory by a second channel, which may also require equalization. In such case, the chipset may become the initiator with the memory 106 as the responder. A chipset may include a clock generator 152 along with signal generator 150 to transmit an EIS and forwarded clock through transceiver 176 to memory 106. Concurrently, the chipset 104 would start a count in counter 154. In one embodiment, the chipset 104 may have a lookup table, such as, lookup table 130 in processor 102. Alternatively, in one embodiment, the chipset 104 may have equalization calculation logic 168, which implements an equation through which the EQ parameters can be determined based on the count from counter 154. Similarly, in one embodiment, the LUT 130 in the processor could be replaced with analogous calculation logic to implement an equation to yield values for the EQ parameters.

In another embodiment, the chipset 104 may be the initiator to assume the EQ parameters for both the first channel 108 and the second channel 110. In any of the proceeding embodiments, the initiator may elect to use the longest link element for the signaling as this will determine the EQ parameter for worst case margin.

After channel 110 is equalized, assuming, for example, that memory 106 is an FBD, the buffer chip (not shown) may be required to equalize the point to point channels between the buffer and each of the DRAMs. Thus, in one embodiment, the equalization procedure may be performed serially with each responder becoming an initiator for its down stream channels. Moreover, in such an embodiment, the buffer chip would be the initiator for multiple responders.

Figure 2:
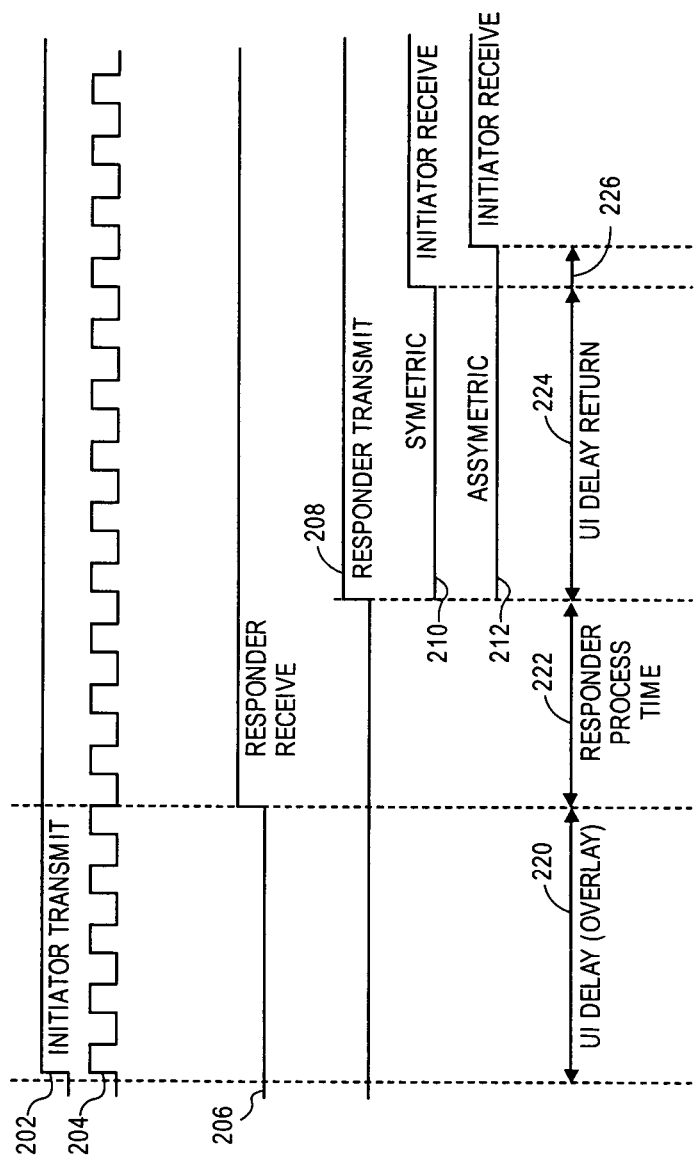
FIG. 2 is a timing diagram showing one example of signaling between an initiator and a responder in one embodiment of the invention.

FIG. 2 is a timing diagram showing one example of signaling between an initiator and a responder in one embodiment of the invention. At an initial time, the initiator transmits the EIS signal such as step signal 202 along with a forwarded clock 204 towards a responder. After a number of unit intervals (UIs) one way delay (the one way delay measured in unit intervals), EIS 206 is received at the responder. After a responder process time 222, the responder transmits a response EIS 208, which is received a UI delay return time later at the initiator. Responder sends the EIS over a separate link, from the one on which the initiator is transmitting. This may be the return link of the same channel or a different link if the interface is assymmetric. If the interface is assymmetric, the signal 212 will arrive at the initiator a return delay 226 later which may be greater or less than the UI one way delay 220 from the initiator to the responder. If the interface is symmetric, the return EIS 210 will arrive at the initiator, a UI return delay 224, which is approximately equal to the UI delay one way 220. The average delay in the channel may be discerned by taking the round trip delay 220 plus 222, plus 226 less responder process time 222. In one embodiment, as noted above, this may be calculated by initiating a count concurrently with the transmission of the step signal and forwarded clock and then terminating the count upon receipt of response EIS signal. The count may then be reduced by the known responder process time to yield a measure of round trip delay on the channel.

Figure 3:
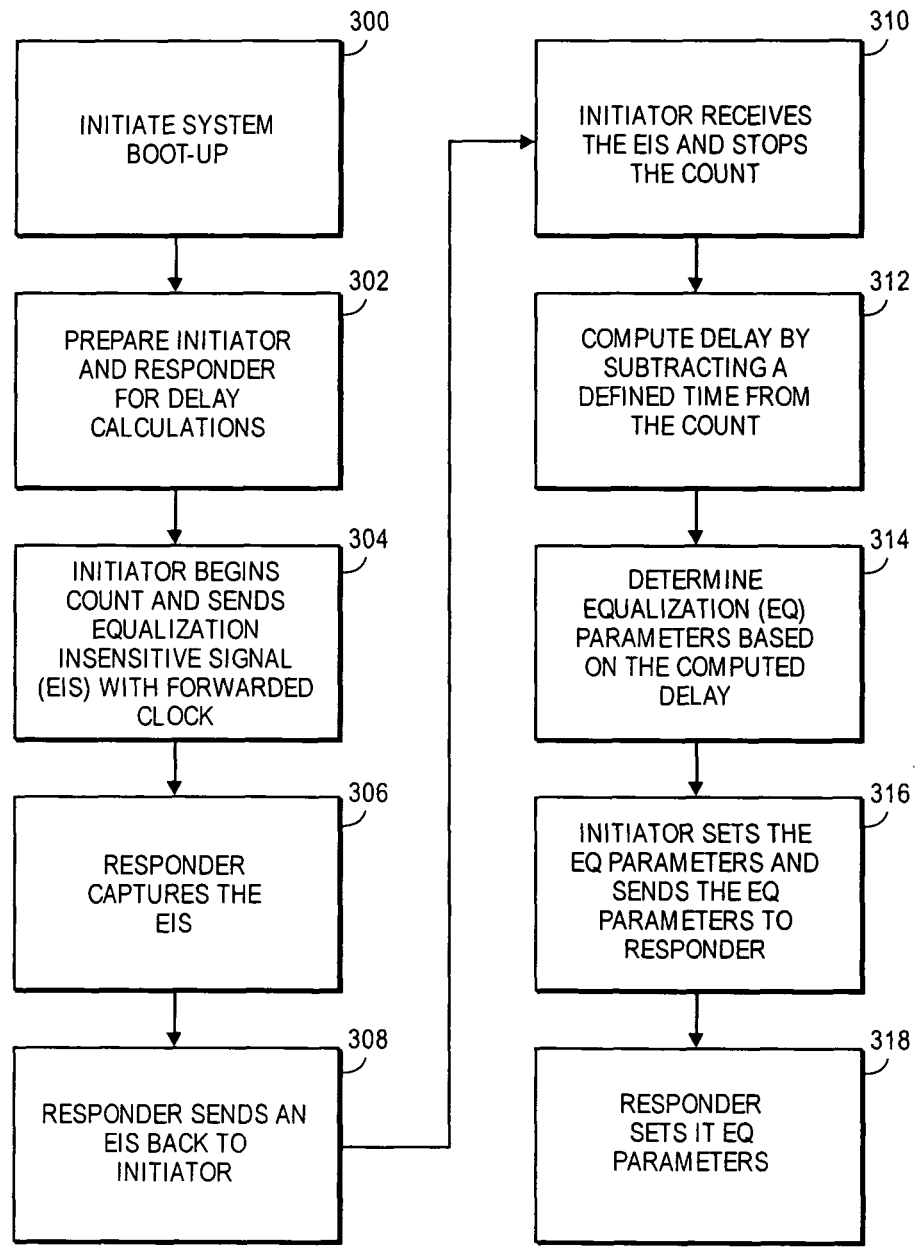
FIG. 3 is a flow diagram of equalization self-determination in one embodiment of the invention.

FIG. 3 is a flow diagram of equalization self-determination in one embodiment of the invention. A system initiates boot-up at block 300. At block 302, the initiator and responder are prepared for a delay calculation. In one embodiment, this preparation involves communication between the initiator and responder over another communication channel than the one to be equalized. In another embodiment, it entails communication of the channel to be equalized at very low speeds such that inadequate initial equalization does not preclude communication. At block 304, the initiator begins a count as it concurrently sends an EIS with a forwarded clock to the responder. The responder captures the EIS at block 306. At block 308, after some processing time, the responder sends any EIS back to the initiator. The initiator receives the EIS from the responder and terminates the count at block 310. At block 312, the initiator computes the delay by subtracting the defined number of counts equal to the responder processing time from the count. At block 314, an equalization parameter is determined based on the computed delay. In one embodiment, the computed delay may be used to index into a lookup table. In another embodiment, the computer delay may be input into logic which implements an equation to calculate an equalization parameters based on that delay.

At block 316, the initiator sets its equalization parameters as determined at block 314 and sends the equalization parameters to the responder. The responder then sets its equalization parameters at block 318. In the event the responder has its own additional channels to equalize, it then continues from block 302 as applied to that or those additional channels.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
    a motherboard;.
    a processor to self-determine an equalization parameter for a first channel on which the processor communicates, the processor coupled to the motherboard;
    a chipset coupled to the motherboard, the motherboard defining the first channel between the chipset and the processor;
    a memory coupled to the motherboard; and
    the motherboard defining a second channel between the memory and the chipset.

2. The system of claim 1 wherein the chipset comprises:
    logic to self-determine an equalization parameter for the second channel.

3. The system of claim 1 wherein the processor and the chipset each comprise:
    a signal generator to generate an equalization insensitive signal; and
    a counter to determine a delay from transmission of the equalization insensitive signal to receipt of a response signal.

4. The system of claim 1 wherein the processor comprises:
    logic to determine a round trip signal delay on the first channel; and
    a lookup table indexed by the delay to identify the equalization parameter.

5. The system of claim 1 wherein the first channel comprises:
a plurality of link elements of different lengths and wherein the equalization parameter is determined from a delay on the longest link element of the channel.

\* \* \* \* \*